United States Patent
Lucke et al.

(10) Patent No.: US 7,249,017 B2
(45) Date of Patent: Jul. 24, 2007

(54) SPEECH RECOGNITION WITH SCORE CALCULATION

(75) Inventors: Helmut Lucke, Tokyo (JP); Katsuki Minamino, Tokyo (JP); Yasuharu Asano, Kanagawa (JP); Hiroaki Ogawa, Chiba (JP)

(73) Assignee: Sony Corporation, Tokyo (JP)

( * ) Notice: Subject to any disclaimer, the term of this patent is extended or adjusted under 35 U.S.C. 154(b) by 178 days.

(21) Appl. No.: 10/785,246

(22) Filed: Feb. 24, 2004

(65) Prior Publication Data

US 2004/0167779 A1     Aug. 26, 2004

(51) Int. Cl.
*G10L 15/08* (2006.01)
*G06F 17/27* (2006.01)

(52) U.S. Cl. .................. 704/251; 704/10; 704/255
(58) Field of Classification Search ............... 704/7, 704/8, 10, 251, 254, 255, 257
See application file for complete search history.

(56) References Cited

U.S. PATENT DOCUMENTS

| | | | |
|---|---|---|---|
| 5,241,619 A * | 8/1993 | Schwartz et al. ........... 704/200 |
| 5,283,833 A | 2/1994 | Church et al. |
| 5,675,706 A | 10/1997 | Lee et al. |
| 5,689,616 A | 11/1997 | Li |
| 5,729,659 A | 3/1998 | Potter |
| 5,805,771 A | 9/1998 | Muthusamy et al. |
| 5,832,428 A | 11/1998 | Chow et al. |
| 5,835,888 A | 11/1998 | Kanevsky et al. |
| 5,956,668 A * | 9/1999 | Alshawi et al. ................. 704/2 |
| 5,987,409 A * | 11/1999 | Tran et al. ................... 704/240 |
| 6,098,035 A * | 8/2000 | Yamamoto et al. ............ 704/9 |
| 6,108,627 A * | 8/2000 | Sabourin .................... 704/243 |
| 6,195,634 B1 | 2/2001 | Dudemaine et al. |
| 6,308,152 B1 * | 10/2001 | Konuma et al. ............. 704/238 |
| 6,662,159 B2 * | 12/2003 | Komori et al. .............. 704/255 |
| 7,165,019 B1 * | 1/2007 | Lee et al. ........................ 704/2 |
| 2001/0051868 A1 * | 12/2001 | Witschel ......................... 704/9 |
| 2001/0053974 A1 * | 12/2001 | Lucke et al. ................ 704/240 |

OTHER PUBLICATIONS

El Meliani et al., "A Syllabic-Filler-Based Continuous Speech Recognizer for Unlimited Vocabulary," Canadian Conference on Electrical and Computer Engineering, Sep. 5-8, 1995, vol. 2, pp. 1007-1010.*

(Continued)

*Primary Examiner*—Martin Lerner
(74) *Attorney, Agent, or Firm*—Frommer Lawrence & Haug LLP; William S. Frommer; Paul A. Levy

(57) ABSTRACT

In order to prevent degradation of speech recognition accuracy due to an unknown word, a dictionary database has stored therein a word dictionary in which are stored, in addition to words for the objects of speech recognition, suffixes, which are sound elements and a sound element sequence, which form the unknown word, for classifying the unknown word by the part of speech thereof. Based on such a word dictionary, a matching section connects the acoustic models of an sound model database, and calculates the score using the series of features output by a feature extraction section on the basis of the connected acoustic model. Then, the matching section selects a series of the words, which represents the speech recognition result, on the basis of the score.

11 Claims, 7 Drawing Sheets

OTHER PUBLICATIONS

Haeb-Umbach et al., "Automatic Transcription of Unknown Words in a Speech Recognition System," ICASSP-95. Conference on Acoustics, Speech, and Signal Processing, May 9-12, 1995, vol. 1, pp. 840-843.*

Geutner P: "Using Morphology Towards Better Large-Vocabulary Speech Recognition Systems" Proceedings of the International Conference on Acoustics, Speech, and Signal Processing (ICASSP). Detroit, May 9-12, 1995. Speech, New York, IEEE, US, vol. 1, May 9, 1995, pp. 445-448, XP000658026 ISBN: 0-7803-2432-3.

Database Inspec 'Online! Institute of Electrical Engineers, Stevenage, GB; Yun-Jin Nam et al: "Constructing dictionary information for the processing of derivational suffixes of nouns based on corpus analysis" Database accession No. 5325565 XP002178808 & Softw. Appl. (South Korea), Journal of KISS(B) (Software and Applications), Apr. 1996, Korea Inf. Sci. Soc, South Korea, vol. 23, No. 4, pp. 389-401.

Kjell Elenius, "Comparing a connectionist and a rule based model for assigning parts-of speech," 1990 International Conference on Acoustics, Speech, and Signal Processing, ICASSP-90, Apr. 3-6, 1990, vol. 1, pp. 597-600.

* cited by examiner

SPEECH RECOGNITION WITH SCORE CALCULATION

BACKGROUND OF THE INVENTION

1. Field of the Invention

The present invention relates to a speech recognition apparatus, a speech recognition method, and a recording medium. More particularly, the present invention relates to a speech recognition apparatus and a speech recognition method which are capable of reducing degradation of speech recognition accuracy, for example, in a case where an unknown word is contained in an utterance, and to a recording medium therefor.

2. Description of the Related Art

FIG. 1 shows the construction of an example of a conventional speech recognition apparatus for performing continuous speech recognition.

Speech produced by a user is input to a mike (microphone) 1. In the microphone 1, the input speech is converted into an audio signal as an electrical signal. This audio signal is supplied to an AD (Analog-to-Digital) conversion section 2. In the AD conversion section 2, the audio signal, which is an analog signal, from the microphone 1 is sampled and quantized, and is converted into audio data which is a digital signal. This audio data is supplied to a feature extraction section 3.

The feature extraction section 3 performs, for each appropriate frame, acoustic processing, such as Fourier transforming and filtering, on the audio data from the AD conversion section 2, thereby extracting features, such as, for example, MFCC (Mel Frequency Cepstrum Coefficient), and supplies the features to a matching section 4. Additionally, it is possible for the feature extraction section 3 to extract features, such as a spectrum, a linear prediction coefficient, a cepstrum coefficient, and a line spectrum pair.

The matching section 4 performs speech recognition of speech input to the matching section 4 (input speech) based on, for example, the continuous distribution HMM method, while referring to a sound model database 5, a dictionary database 6, and a grammar database 7 as necessary by using the features from the feature extraction section 3.

More specifically, the sound model database 5 stores therein a sound model showing acoustic features of individual sound elements and syllables in a spoken language for which speech recognition is performed. Here, since speech recognition is performed based on the continuous distribution HMM method, for the sound model, for example, HMM (Hidden Markov Model) is used. The dictionary database 6 stores therein word dictionaries in which information for the pronunciation (phonological information) of each word (vocabulary) which is the object of speech recognition is described. The grammar database 7 stores therein grammar rules (language models) for the way in which each word entered in the word dictionary of the dictionary database 6 is connected (chained). Here, as the grammar rule, for example, a rule based on context free grammar (CFG), statistical word sequencing probability (N-gram), etc., can be used.

The matching section 4 connects sound models stored in the sound model database 5 by referring to the word dictionary of the dictionary database 6, thereby forming a sound model (word model) of the word. Furthermore, the matching section 4 connects several word models by referring to the grammar rules stored in the grammar database 7, and uses the word model which is connected in that manner in order to recognize, based on the features, the speech input to the microphone 1 by the continuous distribution HMM method. That is, the matching section 4 detects a series of word models in which the score (likelihood) at which the features of the time series output by the feature extraction section 3 are observed is greatest, and outputs a word sequence corresponding to that series of word models as the speech recognition result.

More specifically, the matching section 4 accumulates the appearance probability of each feature for the word sequence corresponding to the connected word model, assumes the accumulated value as a score, and outputs the word sequence which maximizes the score as a speech recognition result.

The score calculation is generally performed by jointly evaluating an acoustic score (hereinafter referred to as an "acoustic score" where appropriate) given by the sound model stored in the sound model database 5 and a linguistic score (hereinafter referred to as a "linguistic score" where appropriate) given by the grammar rule stored in the grammar database 7.

More specifically, for example, in the case of the HMM method, the acoustic score is calculated, for each word from the acoustic models which form a word model, based on the probability at which the sequence of features output by the feature extraction section 3 is observed (appearance probability). Also, for example, in the case of a bigram, the linguistic score is determined based on the probability at which a particular word and a word immediately before that word are connected (chained). Then, the speech recognition result is determined based on a final score (hereinafter referred to as a "final score" where appropriate) obtained by jointly evaluating the acoustic score and the linguistic score for each word.

Specifically, when a k-th word in a word sequence composed of N words is denoted as $w_k$, and when the acoustic score of the word $w_k$ is denoted as $A(w_k)$ and the linguistic score is denoted as $L(w_k)$, the final score of that word sequence is calculated, for example, based on the following equation:

$$S=\Sigma(A(w_k)+C_k \times L(w_k)) \qquad (1)$$

where $\Sigma$ represents summation by varying k from 1 to N, and $C_k$ represents a weight applied to the linguistic score $L(w_k)$ of the word $w_k$.

The matching section 4 performs a matching process for determining, for example, N by which the final score shown in equation (1) is maximized and a word sequence $w_1$, $w_2, \ldots, w_N$, and outputs the word sequence $w_1, w_2, \ldots, w_N$ as the speech recognition result.

As a result of processing such as that described above being performed, in the speech recognition apparatus in FIG. 1, for example, when a user utters "ニューヨークに行きたいです (I want to go to New York)", an acoustic score and a linguistic score are given to each word, such as "ニューヨーク", "に", "行きたい", and "です". When the final score obtained by jointly evaluating those is greatest, a word sequence "ニューヨーク", "に", "行きたい", and "です" is output as a speech recognition result.

If the calculation of the acoustic score is performed independently for all the words entered in the word dictionary of the dictionary database 6, since the amount of calculations is large, a method of making common (sharing) portions of calculations of the acoustic score for a plurality of words may be used. That is, there is a method in which, of the words of the word dictionary, for the words whose phonemes at the start thereof are the same, a common acoustic model is used from the start phoneme up to the phoneme which is the same as the start phoneme, and individual acoustic models are used for the phonemes thereafter, thereby forming one tree-structured network as a whole, and an acoustic score is determined by using this network.

In this case, for example, as shown in FIG. 2, the word dictionary is formed by a network of words of a tree structure (word network), which is obtained by sequentially connecting branches corresponding to the phonemes from the start of each word which is the object of speech recognition, from a root node which is a starting point.

When the word network is formed, for the words whose phonemes at the start thereof are the same, in the manner described above, branches corresponding to the start phoneme up to the phoneme which is the same as the start phoneme are commonly used. That is, in FIG. 2, an alphabetic character surrounded by slashes (/) attached to each branch indicates a phoneme, and a portion enclosed by a rectangle indicates a word. For example, for words "I", "ice", "icy", and "up", the phoneme /A/ at the start thereof is the same and, therefore, a common branch corresponding to the phoneme /A/ is made. Also, for the words "I", "ice", and "icy", since the second phoneme /I/ thereof is also the same, in addition to the start phoneme /A/, a common branch corresponding to the second phoneme /I/ is also made. Furthermore, for the words "ice" and "icy", since the third phoneme /S/ thereof is the same, a common branch corresponding to the third phoneme /S/ thereof, in addition to the start phoneme /A/ and the second phoneme /I/, is also made.

Furthermore, for the words "be" and "beat", since the first phoneme /B/ thereof and the second phoneme /I/ thereof are the same, common branches corresponding to the start phoneme /B/ and the second phoneme /I/ are made.

In a case where the word dictionary which forms the word network of FIG. 2 is used, the matching section 4 reads, from the sound model database 5, an acoustic model of phonemes corresponding to a series of branches extending from the root node of the word network, connects them, and calculates, based on the connected acoustic model, an acoustic score by using the series of features from the feature extraction section 3.

Consequently, the acoustic scores of the words "I", "ice", "icy", and "up" are calculated in a common manner for the first phoneme /A/ thereof. Also, the acoustic scores of the words "I", "ice", and "icy" are calculated in a common manner for the first and second phonemes /A/ and /I/. In addition, the acoustic scores of the words "ice" and "icy" are calculated in a common manner for the first to third phonemes /A/, /I/, and /S/. For the remaining phoneme (second phoneme) /P/ of the word "up" and the remaining phoneme (fourth phoneme) /I/ of the word "icy", the acoustic score is calculated separately.

The acoustic scores of the words "be" and "beat" are calculated in a common manner for the first and second phonemes /B/ and /I/ thereof. Then, for the remaining phoneme (third phoneme) /T/ of the word "beat", the acoustic score is calculated separately.

Consequently, by using the word dictionary which forms the word network, the amount of calculations of acoustic scores can be greatly reduced.

In the matching section 4, in the manner described above, when acoustic scores are calculated using a series of features on the basis of acoustic models which are connected along a series of branches (hereinafter referred to as a "path" where appropriate) extending from the root node of the word network, eventually, the end node (in FIG. 2, the end of the final branch in a case where movement occurs from the root node to the right along the branches) of the word network is reached. That is, for example, in a case where an HMM is used as an acoustic model, when acoustic scores are calculated using the series of features on the basis of the HMMs connected along the series of branches which form the path, there is a time when the acoustic score becomes large to a certain degree (hereinafter referred to as a "local maximum time" where appropriate) in the final state of the connected HMMs.

In this case, in the matching section 4, it is assumed that the region from the time of the features at the start, used for the calculation of the acoustic scores, to the local maximum time is a speech region in which a word corresponding to the path is spoken, and the word is assumed to be a candidate for a word which is a constituent of the word sequence as the speech recognition result. Then, based on the acoustic models connected along the series of the branches (path) extending from the root node of the word network, the calculations of the acoustic scores of the candidate for the word which is connected after the candidate of that word are performed again using the series of features after the local maximum time.

In the matching section 4, as a result of the above processing being repeated, a word sequence as a candidate of a large number of speech recognition results is obtained. The matching section 4 discards words with a low acoustic score among the candidates of such a large number of word sequences, that is, performs acoustic pruning, thereby selecting (leaving) only a word sequence whose acoustic score is equal to or greater than a predetermined threshold value, that is, only a word sequence which has a certain degree of certainty, from an acoustic point of view, as a speech recognition result, and the processing continues.

In addition, in the process in which a candidate of a word sequence as a speech recognition result is created while calculating the acoustic score in the manner described above, the matching section 4 calculates the linguistic score of a word which is a constituent of the candidates of the word sequence as a speech recognition result, on the basis of the grammar rule, such as N-gram, entered in the grammar database 7. Then, the matching section 4 discards words having a low-acoustic score, that is, performs linguistic pruning, thereby selecting (leaving) only a word sequence whose linguistic score is equal to or greater than a predetermined threshold value, that is, only a word sequence which has a certain degree of certainty, from a linguistic point of view, as a speech recognition result, and the processing continues.

As described above, the matching section 4 calculates the acoustic score and the linguistic score of a word, and performs acoustic and linguistic pruning on the basis of the acoustic score and the linguistic score, thereby selecting one or more word sequences which seem likely as a speech recognition result. Then, by repeating the calculations of the acoustic score and the linguistic score of a word connected after the connected word sequence, eventually, one or more word sequences which have a certain degree of certainty is obtained as a candidate of the speech recognition result. Then, the matching section 4 determines, from among such word sequences, a word sequence having the greatest final score, for example, as shown in equation (1), as the speech recognition result.

In the speech recognition apparatus, the number of words, as the object of speech recognition, to be entered in the word dictionary of the dictionary database 6 is limited, for example, due to the computation speed of the apparatus, the memory capacity, etc.

When the number of words as the object of speech recognition is limited, various problems occur if a user speaks a word which is not the object of speech recognition (hereinafter referred to as an "unknown word" where appropriate).

More specifically, in the matching section 4, even when an unknown word is spoken, the acoustic score of each word entered in the word dictionary is calculated using the features of the speech of the unknown word, and a word whose acoustic score is large to a certain degree is erroneously selected as a candidate of the speech recognition result of the unknown word.

As described above, when an unknown word is spoken, an error occurs at the portion of that unknown word, and furthermore, this error may cause an error at other portions.

More specifically, for example, in the manner described above, in a case where the user speaks "ニューヨークに行きたいです (I want to go to New York)", when "ニューヨーク (New York)" is an unknown word, since an erroneous word is selected in the portion "ニューヨーク (New York)", it is difficult to precisely determine the boundary between "ニューヨーク (New York)", which is an unknown word, and the word "に (to)" which follows. As a result, an error occurs at the boundary between the words and this error affects the calculation of the acoustic score of the other portions.

Specifically, in the manner described above, after an erroneous word, which is not "ニューヨーク (New York)", is selected, the acoustic score of the next word is calculated using the series of features in which the end point of the series of features, used for the calculation of the acoustic score of that erroneous word, is a starting point. Consequently, the calculation of the acoustic score is performed, for example, using the features of the end portion of the speech "ニューヨーク (New York)", or is performed without using the features of the initial portion of the next speech "に (to)". As a result, there are cases in which the acoustic score of the correct word "に (to)" as the speech recognition result becomes smaller than that of the other words.

In addition, in this case, even if the acoustic score of the word which was wrongly recognized as the speech recognition result does not become very large, the linguistic score of the word becomes large. As a result, there are cases in which the score when the acoustic score and the linguistic score are jointly evaluated becomes greater than the score when the acoustic score and the linguistic score of the correct word "に (to)" as the speech recognition result are jointly evaluated (hereinafter referred to as a "word score" where appropriate).

As described above, as a result of making a mistake in the speech recognition of the unknown word, the speech recognition of a word at a position close to the unknown word is also performed mistakenly.

As a word which is the object of speech recognition in the speech recognition apparatus, generally, for example, a word with a high appearance incidence in newspapers, novels, etc., is often selected, but there is no guarantee that a word with a low appearance incidence will not be spoken by a user. Therefore, it is necessary to somehow cope with an unknown word.

An example of a method for coping with an unknown word, is one in which, for example, an unknown word, which is a word which is not the object of speech recognition, is divided into segments, such as sound elements which form the word or a sound element sequence composed of several sound elements, and this segment is considered as a word in a pseudo manner (what is commonly called a "sub-word") so that the word is made an object of speech recognition.

Since there are not very large number of types of sound elements which form a word and sound element sequences, even if such sound elements and sound element sequences are made objects of speech recognition as pseudo-words, this does not exert a very large influence on the amount of calculations and the memory capacity. In this case, the unknown word is recognized as a series of pseudo-words (hereinafter referred to as "pseudo-words" where appropriate), and as a result, the number of unknown words apparently becomes zero.

In this case, even if not only an unknown word, but also a word entered in the word dictionary is spoken, it can be recognized as a series of pseudo-words. Whether the spoken word will be recognized as a word entered in the word dictionary or as an unknown word as a series of pseudo-words, is determined based on the score calculated for each word.

However, in a case where a pseudo-word is used, since the unknown word is recognized as sound elements which are a pseudo-word or a series of sound element sequences, the unknown word cannot be processed by using an attribute thereof. That is, for the unknown word, since, for example, the part of speech as the attribute thereof cannot be known, the grammar rule cannot be applied, causing the speech recognition accuracy to be degraded.

Also, there are some types of speech recognition apparatuses in which the word dictionary for each of a plurality of languages is prestored in the dictionary database 6, and the word dictionary is, for example, switched according to an operation by a user so that speech recognition of a plurality of languages is made possible. In this case, the words of the languages other than the language of the word dictionary which is currently used become unknown words; however, if the language, as the attribute, of the unknown word is known, it is possible to automatically switch to the word dictionary of that language, and furthermore, in this case, the word which was an unknown word can be recognized correctly.

Specifically, for example, in a case where English and French word dictionaries are stored in the dictionary database 6, when the English word dictionary is in use, if it is known that the unknown word is a French word, considering that the speaker changed to a French person, the word dictionary may be switched to the French dictionary from the English dictionary, so that speech recognition with a higher accuracy is made possible.

SUMMARY OF THE INVENTION

The present invention has been achieved in view of such circumstances. An object of the present invention is to improve the speech recognition accuracy by allowing the attribute of the unknown word to be obtained.

To achieve the above-mentioned object, according to one aspect of the present invention, there is provided a speech recognition apparatus comprising: extraction means for extracting features of the speech from the speech; calculation means for calculating the score using the features on the basis of a dictionary in which unknown-word-forming elements, which are elements forming an unknown word, for classifying an unknown word by an attribute thereof and words for the object of speech recognition are entered; and selection means for selecting a series of the words, which represents a speech recognition result, on the basis of the score.

In the dictionary, unknown-word-forming elements for classifying an unknown word by a part of speech thereof may be entered.

In the dictionary, suffixes may be entered as the unknown-word-forming elements.

In the dictionary, phonemes which form an unknown word may be entered together with the suffixes.

In the dictionary, unknown-word-forming elements for classifying an unknown word by a language thereof may be entered.

The speech recognition apparatus of the present invention may further comprise a dictionary.

According to another aspect of the present invention, there is provided a speech recognition method comprising the steps of: extracting features of the speech from the speech; calculating the score using the features on the basis of a dictionary in which unknown-word-forming elements, which are elements forming an unknown word, for classifying an unknown word by an attribute thereof and words for the object of speech recognition are entered; and selecting a series of the words, which represents a speech recognition result, on the basis of the score.

According to yet another aspect of the present invention, there is provided a recording medium having recorded therein a program, the program comprising the steps of: extracting features of the speech from the speech; calculating the score using the features on the basis of a dictionary in which unknown-word-forming elements, which are elements forming an unknown word, for classifying an unknown word by an attribute thereof and words for the object of speech recognition are entered; and selecting a series of the words, which represents a speech recognition result, on the basis of the score.

In the speech recognition apparatus, the speech recognition method, and the recording medium therefor of the present invention, a score is calculated using features on the basis of a dictionary in which unknown-word-forming elements, which are elements forming an unknown word, for classifying an unknown word by an attribute thereof and words for the object of speech recognition are entered, and a series of words, which represents a speech recognition result, is selected on the basis of the score.

The above and further objects, aspects and novel features of the invention will become more fully apparent from the following detailed description when read in conjunction with the accompanying drawings.

DESCRIPTION OF THE PREFERRED EMBODIMENTS

Figure 1:
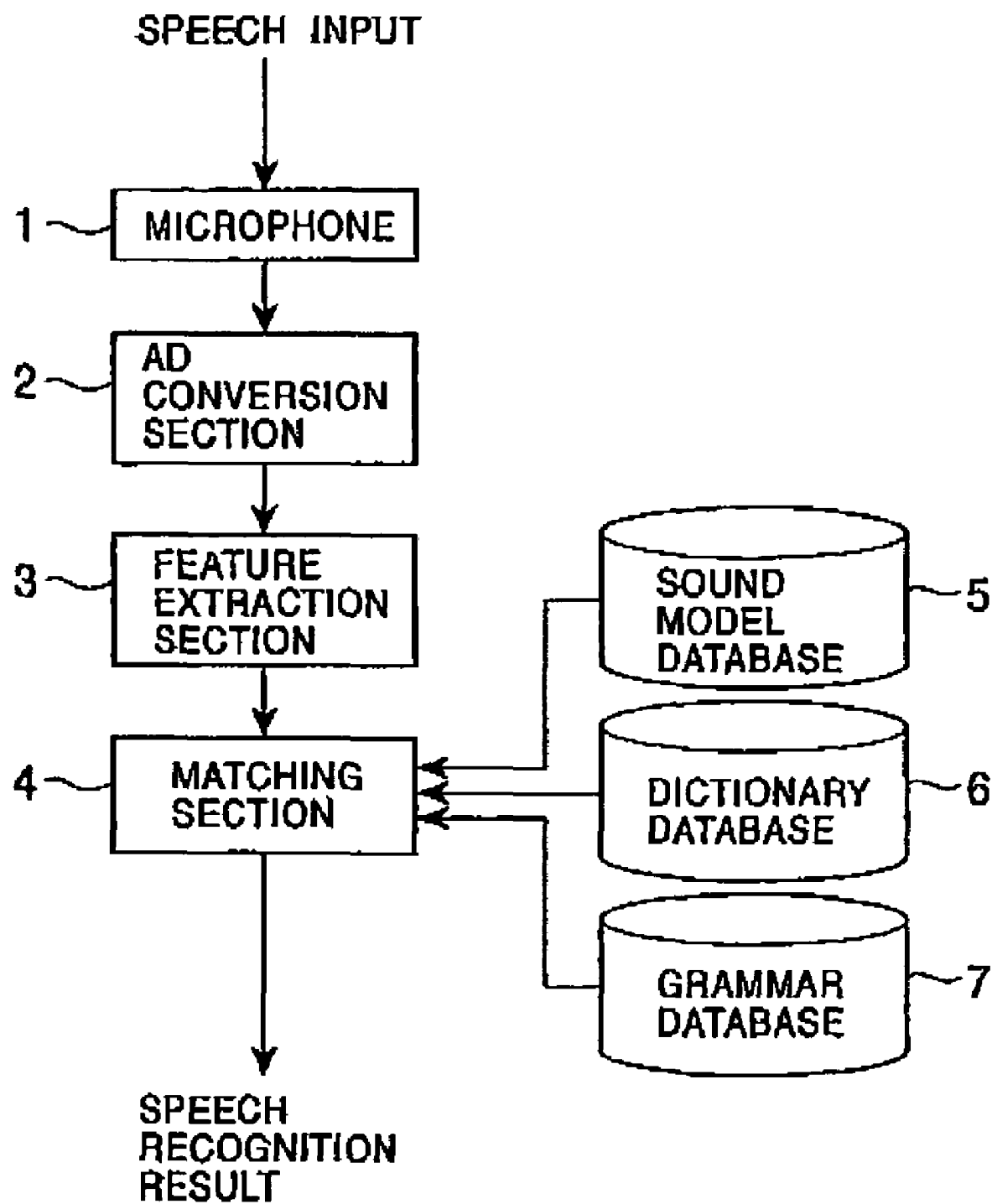
FIG. 1 is a block diagram showing the construction of an example of a conventional speech recognition apparatus.
Figure 3:
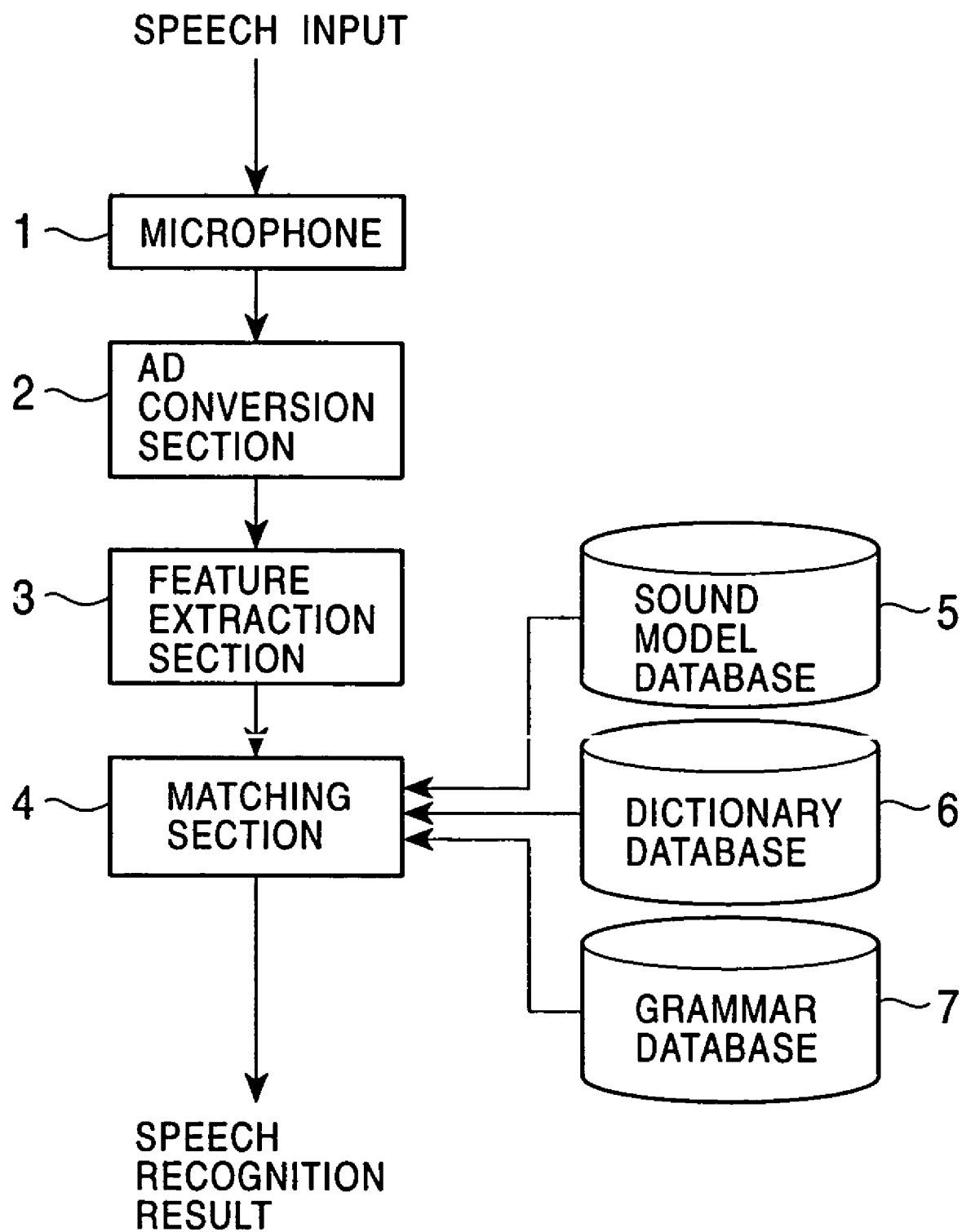
FIG. 3 is a block diagram showing an example of the construction of an embodiment of a speech recognition apparatus to which the present invention is applied.

FIG. 3 shows an example of the construction of an embodiment of a speech recognition apparatus to which the present invention is applied. Components in FIG. 3 corresponding to those in FIG. 1 are given the same reference numerals and, accordingly, in the following, descriptions thereof are omitted. That is, the speech recognition apparatus of FIG. 3 is constructed basically similarly to the speech recognition apparatus of FIG. 1.

However, in addition to a word dictionary in which are entered words for the objects of speech recognition (hereinafter referred to as a "standard dictionary" where appropriate), stored in the dictionary database 6 of FIG. 1, in the dictionary database 6 of the speech recognition apparatus of FIG. 3, an unknown word dictionary is also stored in which unknown-word-forming elements, which are elements forming an unknown word, for classifying an unknown word by an attribute thereof are entered. That is, in the embodiment of FIG. 3, the word dictionary stored in the dictionary database 6 is composed of the standard dictionary and the unknown word dictionary.

Also in the word dictionary of the dictionary database 6 of FIG. 3, a word network is formed similarly to the word dictionary of the dictionary database 6 of FIG. 1.

Figure 2:
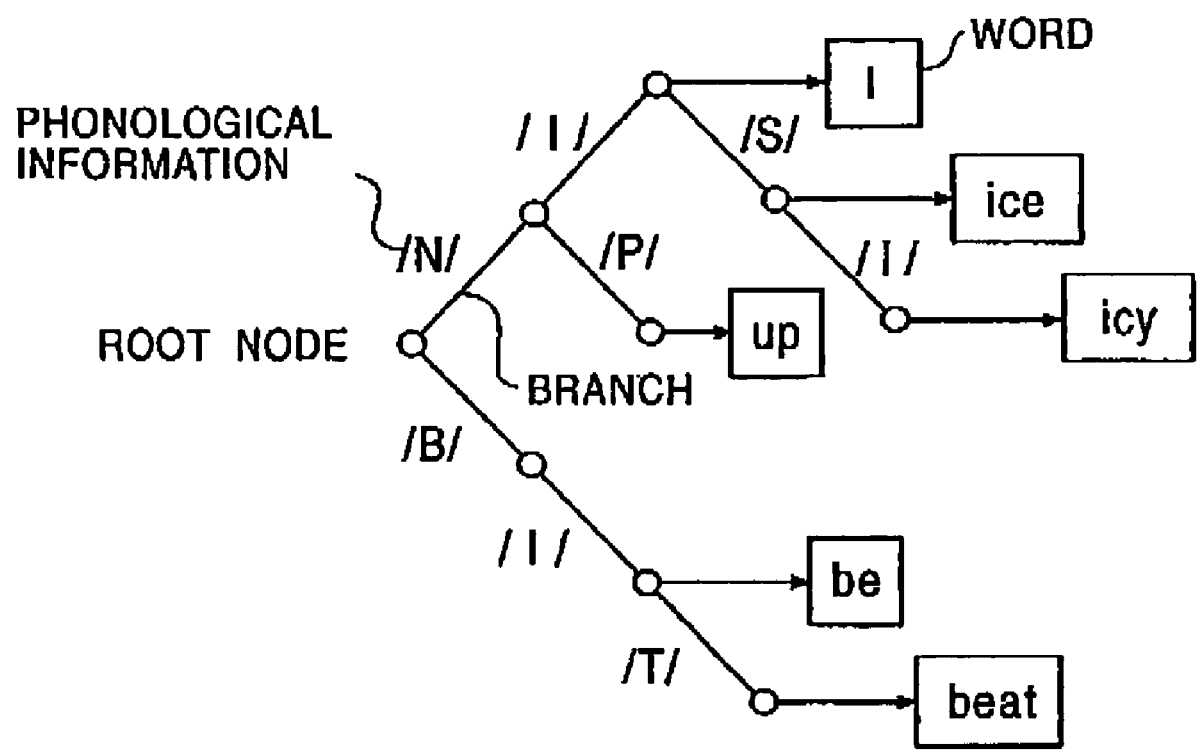
FIG. 2 is a diagram showing an example of the structure of a word dictionary stored in a dictionary database 6 of FIG. 1.
Figure 4:
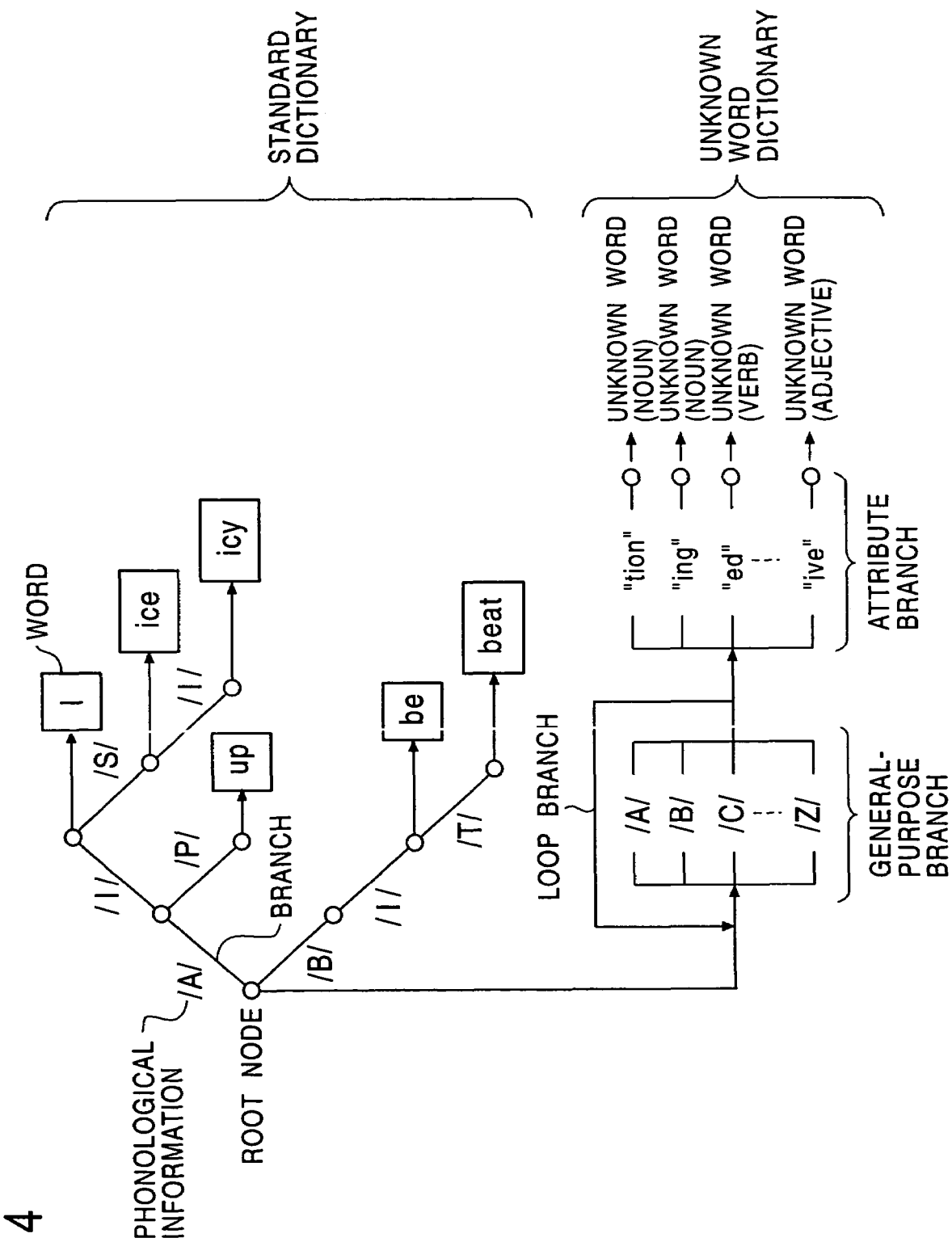
FIG. 4 is a diagram showing an example of the structure of a word dictionary stored in the dictionary database 6 of FIG. 3.

More specifically, in the word dictionary of the dictionary database 6 of FIG. 3, for example, as shown in FIG. 4, a word dictionary similar to the case in FIG. 2 described above is formed, and this is assumed to be a standard dictionary. Furthermore, in the word dictionary of the dictionary database 6 of FIG. 3, a general-purpose branch, which is one or more branches, to which the phonemes of a pseudo-word which is a sound element or a sound element sequence which form an unknown word correspond, is connected to the root node, and furthermore, an attribute branch, which is one or more branches, to which phonemes (sequence) for classifying the unknown word by an attribute thereof corresponds, is connected to the general-purpose branch, thereby forming a word network for coping with the unknown word, and this is assumed to be an unknown word dictionary.

More specifically, in the embodiment of FIG. 4, the unknown-word dictionary is formed in such a way that a general-purpose branch and an attribute branch are connected in sequence to the root node. Furthermore, a branch which acts as a loop (hereinafter referred to as a "loop branch" where appropriate) is connected to the general-purpose branch. Since the general-purpose branch is formed of one or more branches to which the phonemes of a pseudo-word which is various sound elements or a sound element sequence correspond, by repeating passing through the general-purpose branch and after going through the loop branch, passing through the general-purpose branch again, all the words (containing both the words entered in the standard dictionary, and the unknown words) can be recognized as a series of pseudo-words.

However, whether the spoken word will be recognized as a word entered in the standard dictionary or as an unknown word as a series of pseudo-words is determined based on the score calculated for each word.

In addition to the loop branch, in the manner described above, the attribute branch is connected to the general-purpose branch. The attribute branch is composed of one or more branches to which the phonemes (sequence) of a suffix for classifying, for example, an unknown word, by the part of speech thereof correspond. That is, if the language for the object of speech recognition is, for example, English, the attribute branch is formed of, for example, a branch to which the phonemes of "tion" and "ing", which are generally suffixes of English nouns, correspond; a branch to which the phonemes of "ed", which is generally a suffix of a English verb, correspond; a branch to which the phonemes of "ive", which is generally a suffix of a English adjective, correspond; and other branches.

In the matching section 4 of FIG. 3, in a manner similar to the matching section 4 of FIG. 1, an acoustic model stored in the sound model database 5 is connected along the series (path) of branches extending from the root node of the word network which forms the word dictionary shown in FIG. 4, and based on the connected acoustic model, the acoustic score is calculated using the series of the features. As a result, eventually, the final node of the word network is reached, and the acoustic score is obtained. That is, for example, in a case where an HMM is used as an acoustic model, the acoustic score is calculated using the series of the features on the basis of the connected HMM along the series of the branches which form the path. As a result, in the final state of the connected HMM, the acoustic score becomes large to a certain degree at a particular time (local maximum time), and the acoustic score is assumed to be the acoustic score of the word corresponding to the path used for the calculation.

In this case, if the series of the features used for the calculation of the acoustic score is that of the speech of the word entered in the standard dictionary, basically, the acoustic score calculated along the path corresponding to any one of the words of the word network which forms the standard dictionary becomes larger.

If, on the other hand, the series of the features used for the calculation of the acoustic score is that of the speech of a word which is not entered in the standard dictionary, that is, an unknown word, the acoustic score calculated along the path corresponding to any one of the paths of the word network which forms the unknown word dictionary becomes larger.

More specifically, regarding the stem (or the root of a word, a fundamental part, or a base part) excluding the suffix of an unknown word, by repeating passing through the general-purpose branch and after going through the loop branch, passing through the general-purpose branch again as necessary, an acoustic score which is large to a certain degree is obtained. Regarding the suffix of the unknown word, by passing through the attribute branch to which the phonemes of the suffix correspond, an acoustic score which is large to a certain degree is also obtained. Therefore, regarding the unknown word, the acoustic score which is calculated along the path which passes through the general-purpose branch a predetermined number of times and thereafter passes through a predetermined attribute branch becomes larger than the acoustic score calculated along the other paths.

The attribute branch which is a constituent of the path used when the acoustic score of the unknown word becomes large makes it possible to obtain the part of speech of the unknown word. That is, if the attribute branch which is a constituent of the path is one to which the phonemes of "tion" and "ing" correspond, it can be estimated that the part of speech of the unknown word is a noun. Furthermore, if the attribute branch is one to which the phonemes of "ed" correspond, it can be estimated that the part of speech of the unknown word is a verb. Also, if the attribute branch is one to which the phonemes of "ive" correspond, it can be estimated that the part of speech of the unknown word is an adjective.

Figure 5:
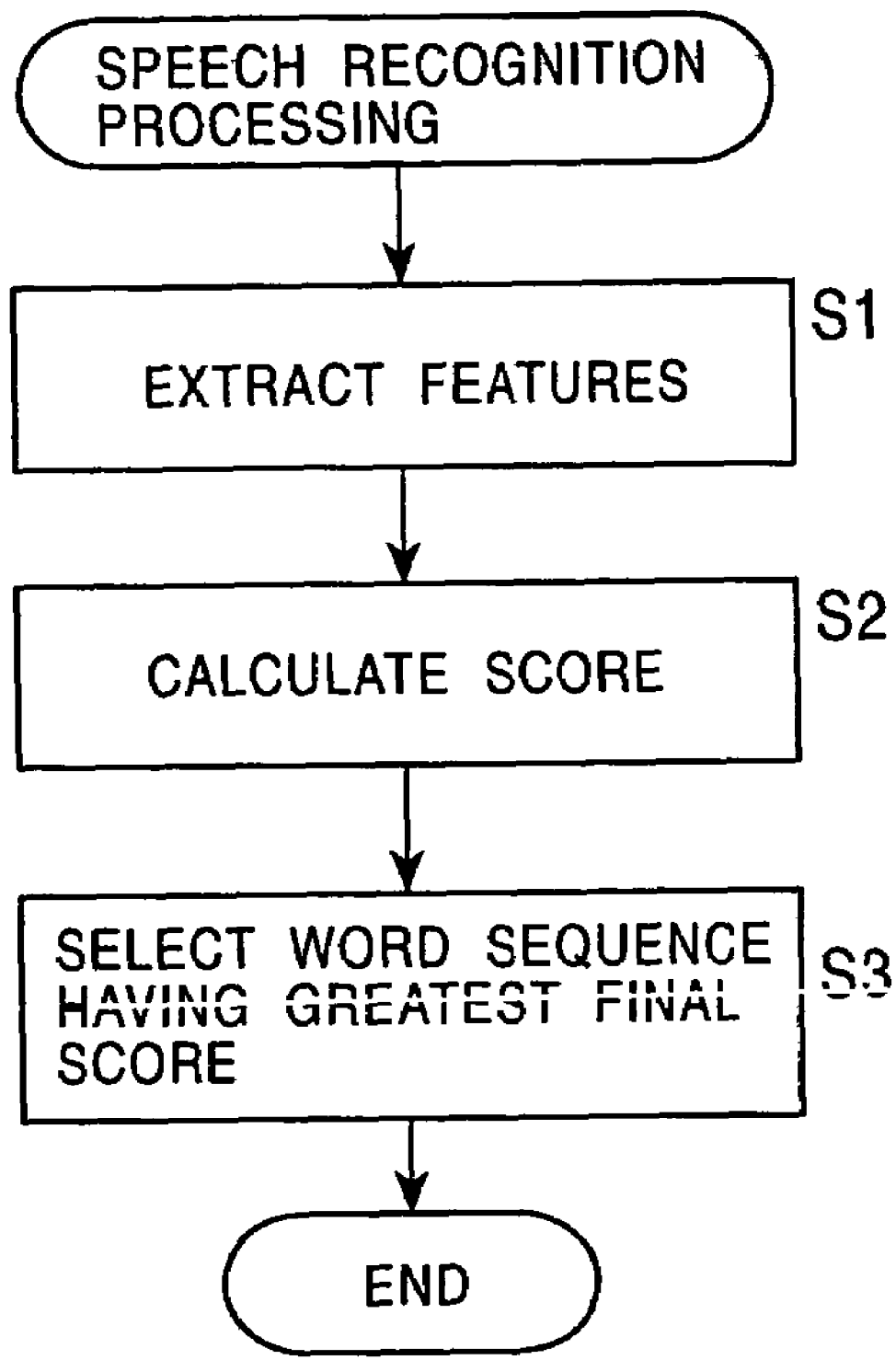
FIG. 5 is a flowchart illustrating processing of the speech recognition apparatus of FIG. 3.

Next, referring to the flowchart in FIG. 5, a continuous speech recognition process by the speech recognition apparatus of FIG. 3 is described.

When a user utters, the sound as the utterance enters through the microphone 1 and the AD conversion section 2, thereby being converted into digital sound data, and this data is supplied to the feature extraction section 3. In step S1, the feature extraction section 3 extracts the features of the speech in sequence for each frame from the sound data supplied thereto, and supplies them to the matching section 4.

The matching section 4 has contained therein a buffer (not shown) and temporarily stores the features supplied from the feature extraction section 3. In step S2, the matching section 4 calculates the score using the series of the necessary features stored in the buffer.

More specifically, in the matching section 4, the acoustic score stored in the sound model database 5 is connected along the series of the branches (path) extending from the root node of the word network which forms the word dictionary shown in FIG. 4, and based on the connected acoustic model, the acoustic score is calculated using the series of the features. As a result, eventually, the final node of the word dictionary is reached, and the acoustic score is obtained.

Specifically, for example, in a case where an HMM is used as the acoustic model, in the matching section 4, the acoustic score is calculated using the series of the features on the basis of the connected HMMs along the series of the branches which form the path. In the process of this calculation, there is a time in which the acoustic score in the final state of the connected HMM becomes large to a certain degree (local maximum time). The acoustic score at the local maximum time is assumed to be the acoustic score of the word (in this embodiment, containing an unknown word in addition to the word entered in the standard dictionary), corresponding to the path used for the calculation.

In addition, in the matching section 4, it is assumed that the region from the time of the features at the start, used for the calculation of the acoustic scores, to the local maximum time is a speech region in which a word corresponding to the path is spoken, and the word is assumed to be a candidate for a word which is a constituent of the word sequence as the speech recognition result. Then, based on the HMM connected along the series of the branches (path) extending from the root node of the word network, the calculation of the acoustic score of the candidate for the word which is connected after the candidate of the above-mentioned word is performed again using the series of the features after the local maximum time.

In the matching section 4, as a result of the above processing being repeated, one or more word sequences as a candidate of a large number of speech recognition results is obtained. The matching section 4 discards a word sequence having a low acoustic score among the candidates of such a large number of word sequences in order to perform acoustic pruning, thereby selecting only a word sequence whose acoustic score is equal to or greater than a predetermined threshold value, that is, only a word sequence which has a certain degree of certainty, from an acoustic point of view, as a speech recognition result, and the calculation of the score continues.

In addition, in the process in which a candidate of a word sequence as a speech recognition result is created while calculating the acoustic score in the manner described above, the matching section 4 calculates the linguistic score of a word which is a constituent of the word sequence as a candidates of a speech recognition result, on the basis of the grammar rules, such as a bigram (a word occurrence probability in which the relationship with the immediately previous process is taken into consideration) and a trigram (a word occurrence probability in which the relationship between the immediately previous process and the word which is one previous thereto is taken into consideration), entered in the grammar database 7. Then, the matching section 4 discards a word whose linguistic score is low in order to perform linguistic pruning, thereby selecting only a word sequence whose linguistic score is equal to or greater than a predetermined threshold value, that is, only a word sequence which has a certain degree of certainty, from a linguistic point of view, as a speech recognition result, and the processing continues.

Here, in a case where the word sequence as a candidate for the speech recognition result contains an unknown word, regarding the unknown word, the part of speech of the unknown word is obtained by the attribute branches which form the path used when the acoustic score was calculated. Consequently, regarding the unknown word, it is possible to obtain a linguistic score having a higher accuracy by applying the grammar rule (linguistic model) on the basis of the part of speech obtained in that manner.

As described above, the matching section 4 repeats the selection of a word sequence which seems likely as a speech recognition result by calculating the acoustic score and the linguistic score of a word and by performing acoustic and linguistic pruning on the basis of the acoustic score and the linguistic score, and then the calculation of the acoustic score and the linguistic score of a word connected after the connected word sequence. Thus, eventually, the matching section 4 obtains one or more word sequences which are candidates of the speech recognition result over the entirety of the speech region (it is assumed that the speech region is detected by some technique).

The process then proceeds to step S3, whereby the matching section 4 calculates the final score given by, for example, equation (1) described above for each of the one or more word sequences. Furthermore, the matching section 4 selects a word sequence whose final score is greatest, determines the word sequence as the final speech recognition result, and outputs it, and the processing is terminated.

The extraction of the features by the feature extraction section 3 and the score calculation by the matching section 4 are performed in parallel.

Also, in the matching section 4, the acoustic pruning is performed not only on the word sequence which is a candidate for the speech recognition result, but also on the path of the word network of FIG. 4. That is, in the process in which the calculation of the acoustic score along the path is performed, when it is anticipated that an acoustic score which is large to a certain degree cannot be obtained, the calculation of the acoustic score along the path is cancelled at that time. As a result, the amount of calculations is reduced, making quick processing possible.

As described above, a general-purpose branch to which the phonemes of a pseudo-word, which is a sound element or a sound element sequence which forms an unknown word, correspond, is connected to the root node, and furthermore, an attribute branch to which the phonemes (sequence) for classifying the unknown word by the part of speech thereof is connected to the general-purpose branch, thereby forming a word network for coping with the unknown word, and the acoustic score is calculated using the word network. Thus, it is possible to estimate the part of speech of the unknown word and to calculate the linguistic score of the unknown word with a higher accuracy based on the part of speech thereof. As a result, it is possible to prevent the degradation of the speech recognition accuracy due to the fact that an accurate linguistic score cannot be determined for the unknown word, and further possible to improve the speech recognition accuracy.

In the embodiment in FIG. 4, the part of speech of the unknown word is estimated by the suffix thereof. In addition, for example, it is also possible to estimate the meaning contents of the unknown word as the attribute thereof by the prefix thereof, etc., and to use the linguistic score.

Furthermore, it is also possible to estimate, for example, the language of the unknown word as the attribute thereof.

Figure 6:
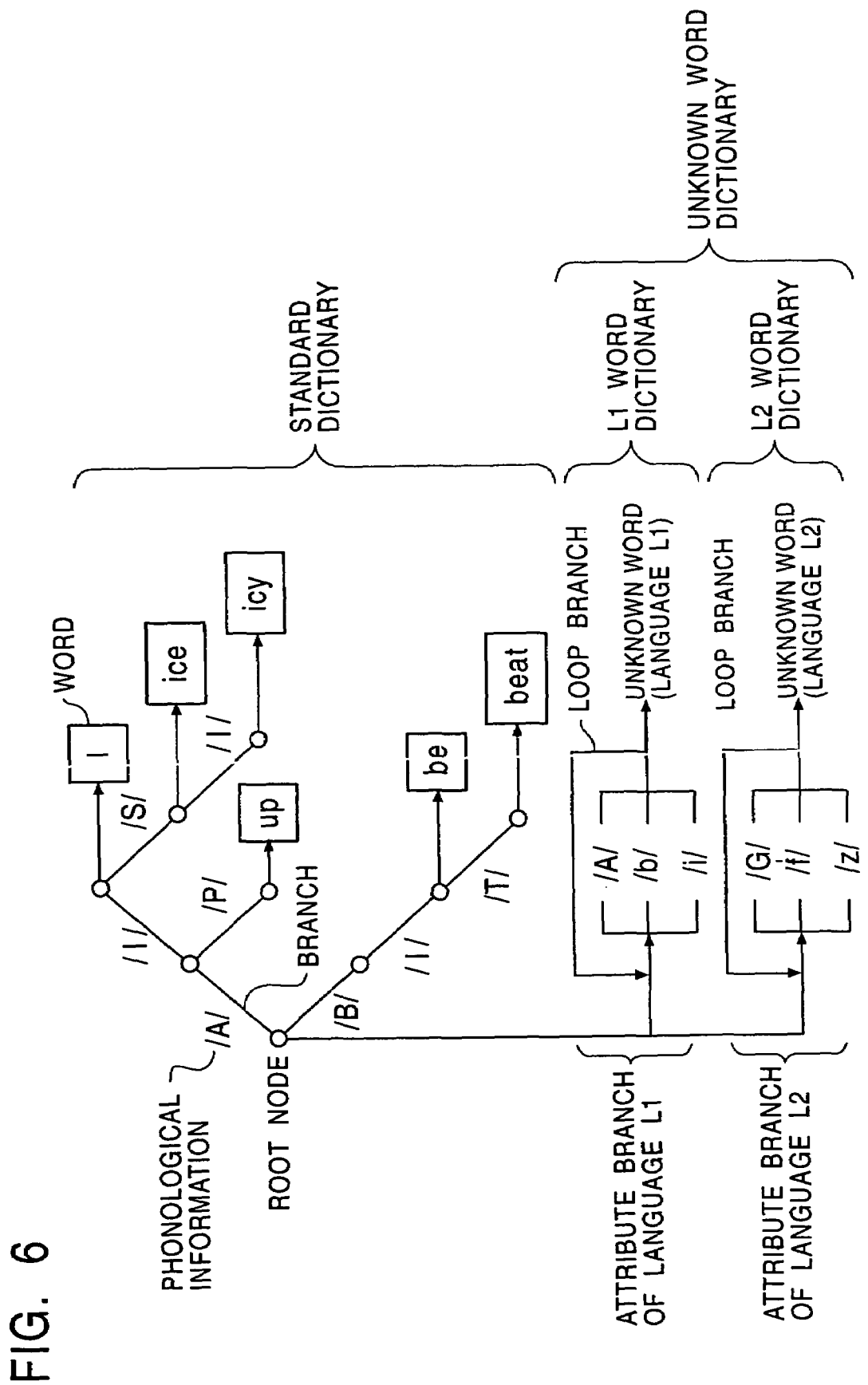
FIG. 6 is a diagram showing another example of the structure of a word dictionary stored in the dictionary database 6 of FIG. 3.

More specifically, when the language of the unknown word is to be estimated, in the word dictionary of the dictionary database 6 of FIG. 3, for example, a word network such as that shown in FIG. 6 is formed.

Also in FIG. 6, in a manner similar to the case in FIG. 4, the word dictionary is composed of a standard dictionary and an unknown word dictionary.

However, in FIG. 6, an attribute branch, which is one or more branches, to which the phonemes of a pseudo-word, which is a sound element or a sound element sequence of the language of an unknown word, correspond, is connected to the root node, thereby forming a word network for coping with the unknown word, and this is assumed to be an unknown word dictionary.

More specifically, in the embodiment of FIG. 6, by assuming that the language for the object of speech recognition by the speech recognition apparatus is basically, for example, English, the standard dictionary is formed by English words.

For each of languages L1 and L2 other than English (for example, French, German, etc.), an unknown word dictionary is formed. Hereinafter, the unknown word dictionaries for the languages L1 and L2 will be referred to as "L1 language dictionary and L2 language dictionary", respectively, where appropriate.

The L1 language dictionary is organized in such a way that one or more attribute branches, to which the phonemes of a pseudo-word, which is a sound element or a sound element sequence of the language L1, correspond, are connected to the root node, and furthermore, a loop branch is connected to the attribute branch. The L2 language dictionary is also organized in such a way that one or more attribute branches, to which the phonemes of a pseudo-word, which is a sound element or a sound element sequence of the language L2, correspond, are connected to the root node, and furthermore, a loop branch is connected to the attribute branch.

Therefore, in FIG. 6, since the attribute branches of the languages L1 and L2 are formed by one or more branches to which the phonemes of a pseudo-word, which is various sound elements or a sound element sequence of the respective languages, correspond, by repeating passing through the attribute branch and after going through the loop branch, passing through the attribute branch again, each word of the languages L1 and L2 can be recognized as a series of pseudo-words.

In this case, however, it is necessary that, in addition to the English acoustic model, the acoustic models of various sound elements and sound element sequences of each of the languages L1 and L2 be stored in the sound model database 5 of FIG. 3.

In a case where the word dictionary which is a constituent of the word network shown in FIG. 6 is to be used, in a manner similar to the case in which the word dictionary of FIG. 4 is used, in the matching section 4, the acoustic model stored in the sound model database 5 is connected along the series of the branches (path) extending from the root node of the word network which forms the word dictionary of FIG. 6, and the acoustic score is calculated using the series of the features on the basis of the connected acoustic model. As a result, eventually, the final node of the word network is reached, and the acoustic score is obtained. That is, for example, in a case where an HMM is used as an acoustic model, an acoustic score is calculated using the series of features on the basis of the HMMs connected along the series of branches which form the path. As a result, in the final state of the connected HMM, the acoustic score becomes large to a certain degree at a particular time (local maximum time). The acoustic score is assumed to be an acoustic score of the word corresponding to the path used for the calculation.

In this case, if the series of the features used for the calculation of the acoustic score is that of the speech of an English word entered in the standard dictionary, basically, the acoustic score calculated along the path corresponding to one of the words of the word network which forms the standard dictionary becomes larger.

If, on the other hand, the series of the features used for the calculation of the acoustic score is that of the speech of the word which is not entered in the standard dictionary, that is, the speech of the word of the language L1 or L2 as the unknown word, the acoustic score calculated along one of the paths of the word network which forms the unknown word dictionary (here, the L1 language dictionary or the L2 language dictionary) becomes larger.

More specifically, regarding the speech of the word of the language L1 or L2 as the unknown word, by repeating passing through the attribute branch of the language L1 or L2 and after going through the loop branch, passing through the attribute branch of the language L1 or L2 again as necessary, an acoustic score larger than the acoustic score calculated along the other paths is obtained.

The attribute branch which is a constituent of the path used when the acoustic score of the unknown word becomes larger makes it possible to obtain the language of the unknown word. That is, if the attribute branch which is a constituent of the path is an attribute branch of the language L1 or L2, it can be estimated that the language of the unknown word is the language L1 or L2.

Therefore, in this case, for example, if the word dictionary organized similarly to the standard dictionary of FIG. 6 is prestored for each of the languages L1 and L2 in the dictionary database 6, in addition to the word dictionary such as that shown in FIG. 6, after the language of the unknown word is estimated to be the language L1 or L2, the word dictionary to be used may be switched to the word dictionary of the estimated language, and the calculation of the score may be performed once more, so that speech recognition of the utterance by the estimated language can be performed with higher accuracy.

Although in the above-described case, estimation of two languages as the languages of the unknown word was made, estimation of only one language or three or more languages can be made.

Next, the above-described series of processing can be performed by hardware and can also be performed by software. In a case where the series of processing is performed by software, programs which form the software are installed into a general-purpose computer, etc.

Figure 7:
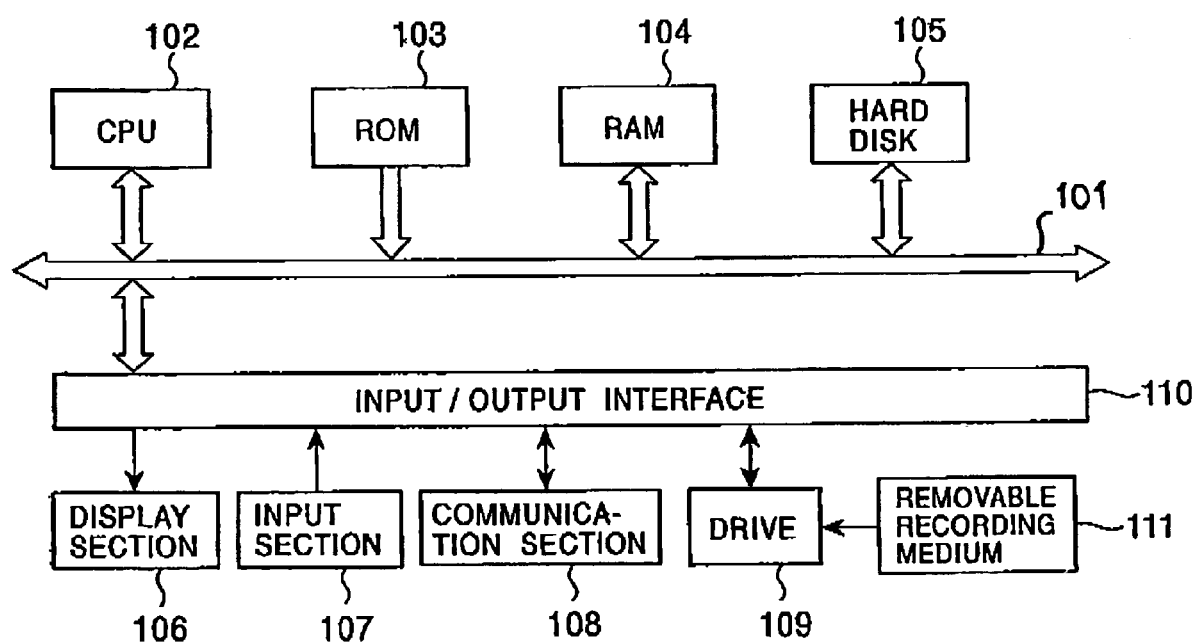
FIG. 7 is a block diagram showing an example of the construction of an embodiment of a computer to which the present invention is applied.

Accordingly, FIG. 7 shows an example of the construction of an embodiment of a computer in which programs which execute the above-described series of processing are installed.

The programs can be recorded in advance in a hard disk 105 as a recording medium contained in the computer and in a ROM 103.

Alternatively, the programs can be temporarily or permanently stored (recorded) in a removable recording medium 111, such as a floppy disk, a CD-ROM (Compact Disc Read Only Memory), an MO (Magneto-optical) disk, a DVD (Digital Versatile Disc), a magnetic disk, or a semiconductor memory. Such a removable recording medium 111 can be provided as what is commonly called package software.

In addition to being installed into a computer from the removable recording medium 111 such as that described above, programs can be transferred in a wireless manner from a download site via an artificial satellite for digital satellite broadcasting or can be transferred by wire to a computer via a network, such as a LAN (Local Area Network) or the Internet, and in the computer, the programs which are transferred in such a manner can be received by a communication section 108 and can be installed into the hard disk 105 contained therein.

The computer has a CPU (Central Processing Unit) 102 contained therein. An input/output interface 110 is connected to a CPU 102 via a bus 101. When a command is input as a result of the user operating an input section 107 formed of a keyboard, a mouse, a microphone, etc., via the input/output interface 110, the CPU 102 executes a program stored in a ROM (Read Only Memory) 103 in accordance with the command. Alternatively, the CPU 102 loads a program stored in the hard disk 105, a program which is transferred from a satellite or a network, which is received by the communication section 108, and which is installed into the hard disk 105, or a program which is read from the removable recording medium 111 loaded into a drive 109 and which is installed into the hard disk 105, to a RAM (Random Access Memory) 104, and executes the program. As a result, the CPU 102 performs processing in accordance with the above-described flowcharts or processing performed according to the constructions in the above-described block diagrams. Then, the CPU 102 outputs the processing result from a display section 106 formed of an LCD (Liquid Crystal Display), a speaker, etc., for example, via the input/output interface 110, as required, or transmits the processing result from the communication section 108, and furthermore, records the processing result in the hard disk 105.

Herein, in this specification, processing steps which describe a program for causing a computer to perform various types of processing need not necessarily perform processing in a time series along the described sequence as a flowchart and contain processing performed in parallel or individually (for example, parallel processing or object-oriented processing) as well.

Furthermore, a program may be such that it is processed by one computer or may be such that it is processed in a distributed manner by plural computers. In addition, a program may be such that it is transferred to a remote computer and is executed thereby.

Although in this embodiment, an HMM is used as an acoustic model, in addition, as the acoustic model, for example, a model based on a neural network can be used.

Although in this embodiment, an unknown word dictionary in which unknown-word-forming elements, which are elements forming the unknown word, for classifying an unknown word by an attribute thereof are contained in the word dictionary used by the matching section 4. In addition, for example, in a speech recognition apparatus for performing what is commonly called a preliminary selection such that one or more words for the object of score calculations by the matching section 4 is preliminarily selected, the unknown word dictionary can be contained in the word dictionary used for the preliminary selection.

In addition, in this embodiment, for the words whose phonemes at the start thereof are the same, a common acoustic model is used from the start phoneme up to the phoneme which is the same as the start phoneme, and individual acoustic models are used for the phonemes thereafter, thereby forming one tree-structured network as a whole, and based on this network, an acoustic score is calculated. However, the calculation of the acoustic score of the word can also be performed independently for each word by connecting the acoustic model individually for each word.

Furthermore, in the embodiment of FIG. 4, a loop branch is connected to a general-purpose branch, and by repeating passing through the general-purpose branch and after going through the loop branch, passing through the general-purpose branch again as necessary, the acoustic score of the word root of the unknown word is calculated. For the word root of the unknown word, in addition, for example, the calculation of the acoustic score can be performed by the viterbi method in such a way that the loop branch is not used and a necessary number of general-purpose branches are connected in series. The same applies to the attribute branch to which the loop branch of FIG. 6 is connected.

In addition, although in this embodiment, English is the object of speech recognition, the present invention can also be applied to a case in which speech recognition is performed for the object of a language other than English.

According to the speech recognition apparatus, the speech recognition method, and the recording medium of the present invention, a score is calculated using features on the basis of a dictionary in which unknown-word-forming elements, which are elements forming an unknown word, for classifying an unknown word by an attribute thereof and words for the object of speech recognition are entered, and a series of words, which represents a speech recognition result, is selected on the basis of the score. Consequently, it is possible to estimate, for example, the attribute, such as the part of speech, of an unknown word, and as a result, it is possible to prevent the degradation of the speech recognition accuracy due to the unknown word.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A speech recognition apparatus for calculating a score indicating a likelihood that one or more speech recognition results of input speech that includes an unknown word is a correct speech recognition result of the unknown word and for performing continuous speech recognition on the input speech based on the score, said speech recognition apparatus comprising:
    extraction means for extracting features of the input speech;
    storing means to store a dictionary database having a standard dictionary area and an unknown word dictionary area;
    calculation means to calculate the score of a word sequence for each candidate for the unknown word in the word sequence by using the extracted features on the basis of the unknown word dictionary area in which unknown-word-forming elements are stored, said elements forming a speech recognition result corresponding to an unknown word, and for classifying said speech recognition result by an attribute thereof; and
    selection means to select a word sequence of speech recognition results that represent the original input speech based on said score,
    wherein the unknown word dictionary includes a general purpose branch and an attribute branch connected in sequence, a loop branch is connected to the general purpose branch, wherein unknown words are repeatedly processed through the general purpose branch a predetermined number of times after going through the loop branch.

2. The speech recognition apparatus according to claim 1, wherein in the unknown word dictionary area, the unknown-word-forming elements for classifying the speech recognition result corresponding to the unknown word by a part of speech thereof are entered.

3. The speech recognition apparatus according to claim 2, wherein in the unknown word dictionary area, suffixes are entered as said unknown-word-forming elements.

4. The speech recognition apparatus according to claim 3, wherein in the unknown word dictionary area, phonemes that form the unknown word are entered together with the suffixes.

5. The speech recognition apparatus according to claim 1, wherein in the unknown word dictionary area, the unknown-word-forming elements for classifying the speech recognition result corresponding to the unknown word by a language thereof are entered.

6. A speech recognition method for calculating a score indicating a likelihood that one or more speech recognition results of input speech including an unknown word is a correct speech recognition of the unknown word, and for performing continuous speech recognition on said speech based on the score, said speech recognition method comprising the steps of:
    extracting features of the input speech;
    storing a dictionary database that is divided into a standard dictionary area and an unknown word dictionary area;
    calculating said score of a word sequence for each candidate for the unknown word in the word sequence by using the extracted features on the basis of the unknown word dictionary area in which unknown-word-forming elements are stored, said elements forming a speech recognition result corresponding to an unknown word, and for classifying the speech recognition result by an attribute thereof; and selecting a word sequence of speech recognition results, which represent the original input speech on said score, wherein the unknown word dictionary includes a general purpose branch and an attribute branch connected in sequence, a loop branch is connected to the general purpose branch, wherein unknown words are repeatedly processed through the general purpose branch a predetermined number of times after going through the loop branch.

7. The speech recognition method according to claim 6, wherein in the unknown word dictionary area, the unknown-word-forming elements for classifying the speech recognition result corresponding to the unknown ward by a language thereof are entered.

8. The speech recognition method according to claim 6, wherein in the unknown word dictionary area, the unknown-word-forming elements for classifying the speech recognition result corresponding to the unknown word by a part of speech thereof are entered.

9. The speech recognition method according to claim 8, wherein in the unknown word dictionary area, suffixes are entered as the unknown-word-forming elements.

10. The speech recognition method according to claim 9, wherein in the unknown word dictionary area, phonemes which form the unknown word are entered together with the suffixes.

11. A computer-readable medium storing a computer program that when executed on a processor performs a method for calculating a score indicating a likelihood that one or more speech recognition results of input speech that includes an unknown word is a correct speech recognition result of the unknown word and for performing continuous speech recognition on the input speech based on the score, said method comprising the steps of:

extracting features of the input speech;

storing a dictionary database that is divided into a standard dictionary area and an unknown word dictionary area;

calculating said score of a word sequence for each candidate for the unknown word in the word sequence by using the extracted features on the basis of the unknown word dictionary area in which unknown-word-forming elements are stored, said elements forming a speech recognition result corresponding to an unknown word, and for classifying the speech recognition result by an attribute thereof; and selecting a word sequence of speech recognition results, which represent the original input speech on said score, wherein the unknown word dictionary includes a general purpose branch and an attribute branch connected in sequence, a loop branch is connected to the general purpose branch, wherein unknown words are repeatedly processed through the general purpose branch a predetermined number of times after going through the loop branch.

* * * * *

UNITED STATES PATENT AND TRADEMARK OFFICE
CERTIFICATE OF CORRECTION

| | | |
|---|---|---|
| PATENT NO. | : 7,249,017 B2 | Page 1 of 1 |
| APPLICATION NO. | : 10/785246 | |
| DATED | : July 24, 2007 | |
| INVENTOR(S) | : Helmut Lucke et al. | |

It is certified that error appears in the above-identified patent and that said Letters Patent is hereby corrected as shown below:

Title Page - Insert

Foreign Application Priority Data

(30) March 14, 2000...(JP)............2000-069698

Signed and Sealed this

Thirtieth Day of October, 2007

JON W. DUDAS
*Director of the United States Patent and Trademark Office*